(12) United States Patent
Gilovich

(10) Patent No.: US 6,853,607 B1
(45) Date of Patent: Feb. 8, 2005

(54) COMBINED STORAGE SYSTEM HAVING A FIXED DATA STORAGE DEVICE AND A REMOVABLE DATA STORAGE DEVICE

(76) Inventor: Paul A. Gilovich, 6075 Stonecreek Dr., Reno, NV (US) 89509

( * ) Notice: Subject to any disclaimer, the term of this patent is extended or adjusted under 35 U.S.C. 154(b) by 326 days.

(21) Appl. No.: 10/161,311

(22) Filed: Jun. 3, 2002

Related U.S. Application Data

(60) Provisional application No. 60/297,636, filed on Jun. 12, 2001.

(51) Int. Cl.$^7$ ................................................ G11B 7/00
(52) U.S. Cl. ................ 369/44.14; 369/176; 369/44.28; 369/53.1
(58) Field of Search ................................ 369/15, 44.11, 369/44.14, 44.12, 44.28, 47.1, 53.1, 59.1, 176, 177, 181, 192

(56) References Cited

U.S. PATENT DOCUMENTS

| | | | | | |
|---|---|---|---|---|---|
| 4,096,579 A | * | 6/1978 | Black et al. | ............. | 360/73.14 |
| 5,331,488 A | * | 7/1994 | McAllister et al. | ...... | 360/98.08 |

* cited by examiner

*Primary Examiner*—Muhammad Edun
(74) *Attorney, Agent, or Firm*—Emery L. Tracy

(57) ABSTRACT

A combined storage system is provided. The combined storage system comprises a fixed data storage device. The fixed data storage device has a spindle shaft for rotating at least one disk and a top plate cover for covering the disk with the spindle shaft extending through the top plate cover. A removable data storage device is attached to the fixed data storage device with the removable data storage device receiving a disc and the spindle shaft rotating the disc.

50 Claims, 1 Drawing Sheet

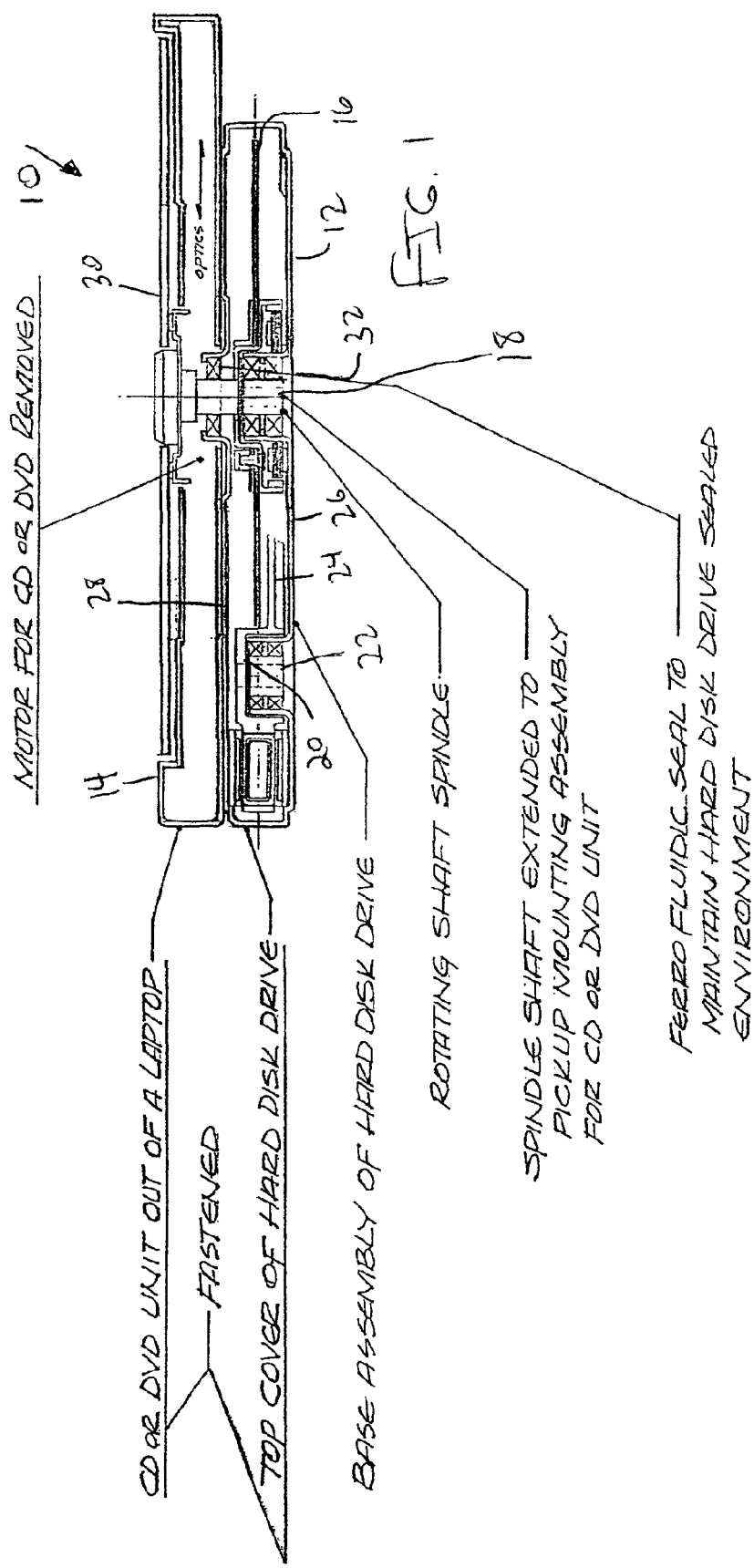

COMBINED STORAGE SYSTEM HAVING A FIXED DATA STORAGE DEVICE AND A REMOVABLE DATA STORAGE DEVICE

The present application claims benefit of pending provisional patent application Ser. No. 60/297,636, filed on Jun. 12, 2001, entitled "Data Storage Device Having A Single Actuator Assembly or Multiple Actuator Assemblies".

BACKGROUND OF THE INVENTION

1. Field of the Invention

This invention relates generally to data storage devices and, more particularly, the invention relates to a combined storage system having a fixed data storage device and a removable data storage device.

2. Description of the Prior Art

Generally, a disk drive is used as an auxiliary memory device in a computer. The disk drive includes at least one disk which is rotated at a high speed by a spindle motor, and a single actuator arm assembly which rotates in response to a voice coil motor about a pivot point for moving a magnetic head on an actuator arm that writes data onto the tracks of the disk and reads the data recorded on the tracks of the disk. The magnetic head is located on a leading end of a head gimbals, which typically moves along both sides of the disk, wherein the magnetic head is influenced by an airflow generated on a surface of the disk as the disk rotates at a high speed to maintain a minute gap between the magnetic head on the actuator arm and the disk.

The elements of the disk drive are typically positioned within a base plate housing covered by a top plate. In an attempt to seal the interior of the disk drive from foreign material and other debris, a gasket is positioned between the base plate and the housing.

Compact disc (CD) and/or digital video disc (DVD) players and recorders are increasingly popular additions to computer systems. Unfortunately, having both a disk drive and a CD and/or DVD player/recorder in a computer system requires additional space within the computer system and uses additional power to operate both the disk drive and the CD and/or DVD player/recorder. Power consumption in a computer system, especially a laptop computer, is a great concern to many computer users.

Furthermore, computer users are typically required to frequently backup their disk drive in order to avoid losing important information if the disk drive fails, the computer system fails, or the computer system unexpectedly loses power. While a separate recordable CD player can assist in maintaining real time backup, the other disadvantages, as mentioned above, are still present.

SUMMARY

The present invention is a combined storage system. The combined storage system comprises a fixed data storage device. The fixed data storage device has a spindle shaft for rotating at least one disk and a top plate cover for covering the disk with the spindle shaft extending through the top plate cover. A removable data storage device is attached to the fixed data storage device with the removable data storage device receiving a disc and the spindle shaft rotating the disc.

Additionally, the present invention includes a method for constructing a data storage device. The method comprises providing a fixed data storage device having a spindle shaft for rotating a disk within the fixed data storage device with the disk being enclosed between a top plate and a bottom plate housing, securing a removable data storage device to the data storage device, extending the spindle shaft through the top plate into the removable data storage device, and rotating a disc receivable within the removable data storage device with the spindle shaft.

The present invention further includes a fixed data storage device having a spindle shaft for rotating a disk within the fixed data storage device with the disk being enclosed between a top plate and a bottom plate housing. The fixed data storage device comprises a removable data storage device attached to the fixed data storage device. An aperture is formed in the top plate of the fixed data storage device for receiving the spindle shaft through the top plate into the removable data storage device. A disc is receivable within the removable data storage device with the disc rotatable with the spindle shaft.

BRIEF DESCRIPTION OF THE DRAWINGS

FIG. 1 is a sectional side view illustrating a combined system having a fixed data storage device and a removable data storage device, constructed in accordance with the present invention, having a single actuator assembly.

DETAILED DESCRIPTION OF THE PREFERRED EMBODIMENTS

As illustrated in FIG. 1, as indicated generally at 10, the Applicant of the present application has also invented a new and improved combined storage system having a fixed data storage device 12 and a removable data storage device 14. The removable data storage device 14 is preferably a CD and/or DVD player/recorder although other types of removable data storage devices 14 are within the scope of the present invention.

The fixed data storage device 12 can be any type of fixed data storage device 12 including, but not limited to, a rotatable storage device. Rotatable storage devices include, but are not limited to, magnetic memory devices such as a hard disk drive apparatus. It should be noted that while the present invention has been described herein and will be described heretofore as a hard disk drive apparatus and the like it is within the scope of the present invention to utilize any type of fixed data storage device 12. The person skilled in the art sill understand that the present invention is not limited to a hard disk drive apparatus and the like.

The fixed data storage device 12 includes at least one disk 16 which is rotated at a high speed by a spindle motor 18 and at least one actuator arm assembly 20 which rotates in response to a voice coil motor 22 about a pivot point for moving a magnetic head (not shown) on an actuator arm 24 that writes data onto the tracks of the disk 16 and reads the data recorded on the tracks of the disk 16. The magnetic head is located on a leading end of a head gimbals (not shown), which typically moves along both sides of the disk 16, wherein the magnetic head is influenced by an airflow generated on a surface of the disk 16 as the disk 16 rotates at a high speed to maintain a minute gap between the magnetic head on the actuator arm 24 and the disk 16. The elements of the data storage device 12 are typically positioned within a base plate housing 26 covered by a top plate cover 28.

It should be noted that the fixed data storage device 12 can have multiple disks 16 and/or multiple actuator assemblies 20. Description and illustration of a single disk 16 and a single actuator arm assembly 20 are for demonstration purposes only and do not limit the invention herein.

As illustrated in FIG. 1 and described above, the present invention is a combined system having a fixed data storage device 12 with a removable data storage device 14. The removable data storage device 14 is assembled with the fixed data storage device 12 with the top plate cover 28 of the fixed data storage device 12 being the same as the base plate of the removable data storage device 14. In other words, the top plate cover 28 of the fixed data storage device 12 is the same as the base plate of the removable data storage device 14.

The spindle shaft 18 of the fixed data storage device 12 extends through the top plate cover 28 into the removable data storage device 14 to rotate the CD disc and/or DVD disc 30 therein. A ferro fluidic seal 32 maintains the fixed data storage device 12 sealed from the environment. Appropriate electronics can be provided to allow, for instance, real time backup of information stored on the combined storage system 10 to the disc 30 in the removable data storage device 14 and vice versa. Furthermore, the fixed data storage device 12 can operate as a normal fixed data storage device 14 separate from the removable data storage device 14 and the removable data storage device 14 can operate as a normal removable data storage device 14 separate from the data storage device 12. It is within the scope of the present invention to combine a CD player/recorder 14 with a DVD player/recorder rather than a fixed data storage device 12.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

What is claimed is:

1. A combined storage system, the combined storage system comprising:
   a fixed data storage device, the fixed data storage device having a spindle shaft for rotating at least one disk and a top plate cover for covering the disk, the spindle shaft extending through the top plate cover; and
   a removable data storage device attached to the fixed data storage device, the removable data storage device receiving a disc, the spindle shaft rotating the disc;
   wherein the removable data storage device is a CD and/or DVD player/recorder.

2. The combined storage system of claim 1 wherein the fixed data storage device is a hard disk drive.

3. The combined storage system of claim 2 wherein the hard disk drive has at least one actuator arm assembly.

4. The combined storage system of claim 3 wherein the hard disk drive has multiple actuator assemblies.

5. The combined storage system of claim 1, and further comprising:
   seal means between the fixed data storage device and the removable data storage device for maintaining the fixed data storage device in a sealed environment.

6. The combined storage system of claim 5 wherein the seal means is a ferro fluidic seal between the fixed data storage device and the removable data storage device.

7. The combined storage system of claim 1, and further comprising:
   electronics for allowing real time backup of information stored on the fixed data storage device to the removable data storage device.

8. A method for constructing a data storage device, the method comprising:
   providing a fixed data storage device having a spindle shaft for rotating a disk within the fixed data storage device, the disk being enclosed between a top plate and a bottom plate housing;
   securing a removable data storage device to the data storage device;
   extending the spindle shaft through the top plate into the removable data storage device;
   rotating a disc receivable within the removable data storage device with the spindle shaft; and
   backing up information stored on the fixed data storage device to the removable data storage device in real time.

9. The method of claim 8, and further comprising:
   providing seal means between the fixed data storage device and the removable data storage device.

10. The method of claim 8, and further comprising:
    backing up of information stored on the removable data storage device to the fixed data storage device in real time.

11. A fixed data storage device having a spindle shaft for rotating a disk within the fixed data storage device, the disk being enclosed between a top plate and a bottom plate housing, the fixed data storage device comprising:
    a removable data storage device attached to the fixed data storage device;
    an aperture formed in the top plate of the fixed data storage device for receiving the spindle shaft through the top plate into the removable data storage device;
    a disc receivable within the removable data storage device, the disc rotatable with the spindle shaft; and
    seal means between the fixed data storage device and the removable data storage device for maintaining the data storage device in a sealed environment;
    wherein the seal means is a ferro fluidic seal between the fixed data storage device and the removable data storage device.

12. The fixed data storage device of claim 11, and further comprising:
    electronics for allowing real time backup of information stored on the fixed data storage device to the removable data storage device.

13. The fixed data storage device of claim 11, and further comprising:
    electronics for allowing real time backup of information stored on the removable data storage device to the fixed data storage device.

14. The fixed data storage device of claim 11 wherein the fixed data storage device is a hard disk drive.

15. The fixed data storage device of claim 14 wherein the hard disk drive has at least one actuator arm assembly.

16. The fixed data storage device of claim 11 wherein the removable data storage device is a CD and/or DVD player/recorder.

17. A combined storage system, the combined storage system comprising:
    a fixed data storage device, the fixed data storage device having a spindle shaft for rotating at least one disk and a top plate cover for covering the disk, the spindle shaft extending through the top plate cover; and a removable data storage device attached to the fixed data storage device, the removable data storage device receiving a disc, the spindle shaft rotating the disc; and seal means between the fixed data storage device and the removable data storage device for maintaining the fixed data storage device in a sealed environment;

wherein the seal means is a ferro fluidic seal between the fixed data storage device and the removable data storage device.

18. The combined storage system of claim 17 wherein the fixed data storage device is a hard disk drive.

19. The combined storage system of claim 18 wherein the hard disk drive has at least one actuator arm assembly.

20. The combined storage system of claim 19 wherein the hard disk drive has multiple actuator assemblies.

21. The combined storage system of claim 17 wherein the removable data storage device is a CD and/or DVD player/recorder.

22. The combined storage system of claim 17, and further comprising:

electronics for allowing real time backup of information stored on the fixed data storage device to the removable data storage device.

23. A combined storage system, the combined storage system comprising:

a fixed data storage device, the fixed data storage device having a spindle shaft for rotating at least one disk and a top plate cover for covering the disk, the spindle shaft extending through the top plate cover;

a removable data storage device attached to the fixed data storage device, the removable data storage device receiving a disc, the spindle shaft rotating the disc; and electronics for allowing real time backup of information stored on the fixed data storage device to the removable data storage device.

24. The combined storage system of claim 23 wherein the fixed data storage device is a hard disk drive.

25. The combined storage system of claim 24 wherein the hard disk drive has at least one actuator arm assembly.

26. The combined storage system of claim 25 wherein the hard disk drive has multiple actuator assemblies.

27. The combined storage system of claim 23 wherein the removable data storage device is a CD and/or DVD player/recorder.

28. The combined storage system of claim 23, and further comprising:

seal means between the fixed data storage device and the removable data storage device for maintaining the fixed data storage device in a sealed environment.

29. The combined storage system of claim 28 wherein the seal means is a ferro fluidic seal between the fixed data storage device and the removable data storage device.

30. A method for constructing a data storage device, the method comprising:

providing a fixed data storage device having a spindle shaft for rotating a disk within the fixed data storage device, the disk being enclosed between a top plate and a bottom plate housing;

securing a removable data storage device to the data storage device;

extending the spindle shaft through the top plate into the removable data storage device;

rotating a disc receivable within the removable data storage device with the spindle shaft; and backing up of information stored on the removable data storage device to the fixed data storage device in real time.

31. The method of claim 30, and further comprising:

providing seal means between the fixed data storage device and the removable data storage device.

32. The method of claim 30, and further comprising:

backing up information stored on the fixed data storage device to the removable data storage device in real time.

33. A fixed data storage device having a spindle shaft for rotating a disk within the fixed data storage device, the disk being enclosed between a top plate and a bottom plate housing, the fixed data storage device comprising:

a removable data storage device attached to the fixed data storage device;

an aperture formed in the top plate of the fixed data storage device for receiving the spindle shaft through the top plate into the removable data storage device;

a disc receivable within the removable data storage device, the disc rotatable with the spindle shaft; and electronics for allowing real time backup of information stored on the fixed data storage device to the removable data storage device.

34. The fixed data storage device of claim 33 wherein the seal means is a ferro fluidic seal between the fixed data storage device and the removable data storage device.

35. The fixed data storage device of claim 33, and further comprising:

electronics for allowing real time backup of information stored on the removable data storage device to the fixed data storage device.

36. The fixed data storage device of claim 33, wherein the fixed data storage device is a hard disk drive.

37. The fixed data storage device of claim 33 wherein the hard disk drive has at least one actuator arm assembly.

38. The fixed data storage device of claim 33 wherein the removable data storage device is a CD and/or DVD player/recorder.

39. A fixed data storage device having a spindle shaft for rotating a disk within the fixed data storage device, the disk being enclosed between a top plate and a bottom plate housing, the fixed data storage device comprising:

a removable data storage device attached to the fixed data storage device;

an aperture formed in the top plate of the fixed data storage device for receiving the spindle shaft through the top plate into the removable data storage device;

a disc receivable within the removable data storage device, the disc rotatable with the spindle shaft; and electronics for allowing real time backup of information stored on the removable data storage device to the fixed data storage device.

40. The fixed data storage device of claim 39 wherein the seal means is a ferro fluidic seal between the fixed data storage device and the removable data storage device.

41. The fixed data storage device of claim 39, and further comprising:

electronics for allowing real time backup of information stored on the fixed data storage device to the removable data storage device.

42. The fixed data storage device of claim 39 wherein the fixed data storage device is a hard disk drive.

43. The fixed data storage device of claim 42 wherein the hard disk drive has at least one actuator arm assembly.

44. The fixed data storage device of claim 39 wherein the removable data storage device is a CD and/or DVD player/recorder.

45. A fixed data storage device having a spindle shaft for rotating a disk within the fixed data storage device, the disk being enclosed between a top plate and a bottom plate housing, the fixed data storage device comprising:

a removable data storage device attached to the fixed data storage device;

an aperture formed in the top plate of the fixed data storage device for receiving the spindle shaft through the top plate into the removable data storage device; and a disc receivable within the removable data storage device, the disc rotatable with the spindle shaft, wherein the removable data storage device is a CD and/or DVD player/recorder.

46. The fixed data storage device of claim 45 wherein the seal means is a ferro fluidic seal between the fixed data storage device and the removable data storage device.

47. The fixed data storage device of claim 45, and further comprising:

electronics for allowing real time backup of information stored on the fixed data storage device to the removable data storage device.

48. The fixed data storage device of claim 45, and further comprising:

electronics for allowing real time backup of information stored on the removable data storage device to the fixed data storage device.

49. The fixed data storage device of claim 45 wherein the fixed data storage device is a hard disk drive.

50. The fixed data storage device of claim 49 wherein the hard disk drive has at least one actuator arm assembly.

* * * * *